(12) United States Patent
Mackey et al.

(10) Patent No.: US 12,511,213 B2
(45) Date of Patent: Dec. 30, 2025

(54) PROGRAMMABLE TELEMETRY AND ALERTS FOR STORAGE DEVICES

(71) Applicant: Sandisk Technologies, Inc., San Jose, CA (US)

(72) Inventors: Grant Mackey, San Jose, CA (US); Bernd Lamberts, San Jose, CA (US); Matias Bjorling, Copenhagen (DK)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/366,381

(22) Filed: Aug. 7, 2023

(65) Prior Publication Data

US 2025/0053490 A1    Feb. 13, 2025

(51) Int. Cl.
*G06F 11/00* (2006.01)
*G06F 11/30* (2006.01)
*G06F 11/32* (2006.01)

(52) U.S. Cl.
CPC ...... *G06F 11/3034* (2013.01); *G06F 11/3072* (2013.01); *G06F 11/324* (2013.01)

(58) Field of Classification Search
CPC .......................... G06F 11/3034; G06F 11/3072
See application file for complete search history.

(56) References Cited

U.S. PATENT DOCUMENTS

| | | |
|---|---|---|
| 8,990,634 B2 | 3/2015 | Sadovsky et al. |
| 9,244,865 B2 | 1/2016 | Hutchison et al. |
| 9,703,675 B2 | 7/2017 | Reid, III et al. |
| 9,996,477 B2 | 6/2018 | Chan et al. |
| 10,848,839 B2 * | 11/2020 | Inbaraj ............... H04Q 9/00 |
| 11,048,581 B2 | 6/2021 | Sinha et al. |
| 11,334,280 B2 | 5/2022 | Navon et al. |
| 11,442,844 B1 * | 9/2022 | Peattie ............... G06F 11/27 |
| 11,516,308 B1 | 11/2022 | Dubynskiy et al. |
| 2018/0067890 A1 * | 3/2018 | Espeseth ............ G06F 13/24 |
| 2018/0074973 A1 | 3/2018 | Chan et al. |
| 2018/0123936 A1 * | 5/2018 | Anderson ........... G06F 11/3072 |
| 2018/0359184 A1 | 12/2018 | Inbaraj et al. |
| 2020/0202017 A1 * | 6/2020 | Parry ............... H04L 9/302 |
| 2021/0405911 A1 | 12/2021 | Navon et al. |
| 2022/0326874 A1 | 10/2022 | Del Gatto et al. |
| 2022/0405419 A1 * | 12/2022 | Joshi ............... G06F 11/3082 |
| 2023/0136524 A1 * | 5/2023 | Borello ............ G06F 21/606 718/1 |
| 2023/0396561 A1 * | 12/2023 | Radi ............... H04L 49/356 |

OTHER PUBLICATIONS

International Search Report and Written Opinion for Application No. PCT/US2024/030484 dated Sep. 6, 2024.

* cited by examiner

*Primary Examiner* — Elmira Mehrmanesh
(74) *Attorney, Agent, or Firm* — Patterson + Sheridan, LLP

(57) ABSTRACT

A streaming data interface or a 'telemetry tap' in conjunction with a host defined telemetry program is used to regulate the type and amount of telemetry data sent to the host device. The amount of telemetry data provided to the host is based on a request. The controller will receive and execute valid host generated programs which define which telemetry operations should occur and be forwarded to the host via the streaming telemetry mechanism. The controller will use the user/host programmable mechanisms that will collaborate with internal drive logging mechanisms. The controller will watch for the host-defined programmable mechanisms and send the requested amount of telemetry data to the host once the programmable mechanisms have executed.

19 Claims, 8 Drawing Sheets

PROGRAMMABLE TELEMETRY AND ALERTS FOR STORAGE DEVICES

BACKGROUND OF THE DISCLOSURE

Field of the Disclosure

Embodiments of the present disclosure generally relate to improving device telemetry for data collection.

Description of the Related Art

Current storage device telemetry data collection is either too coarse or too clunky to be useful to customers for online data collection. This results in either no telemetry collection, which makes debugging and/or prediction of drive failures difficult, or too much data where the customer has no means to reduce the collected data into actionable information.

SMART data collection is the most ubiquitous form of online storage device log collection, but has well documented shortcomings. Other approaches have involved pulling internal proprietary format drive logs as a post-mortem debugging activity to determine why a storage device has failed. These other approaches can be categorized as 'too little' and 'too late' as applied to online drive health monitoring.

Storage devices, such as a hard disk drive (HDD) and a solid state drive (SSD), provide limited choices for exposing telemetry to a host system. Data is either presented in the traditional SMART log format, which is often inaccurate/incomplete or as proprietary binaries that are often too large to be pulled continuously. Using SMART for pulling drive log telemetry is preferred by the host and drive due to the lightweight operation, but SMART is useless in many cases. Vendor specific internal log pulling is a heavy operation which impacts device and host performance. If the user is to use the vendor specific internal log pulling mechanism then other operations must be suspended. Once operations are suspended, the user will get a large amount of data that may or may not be useful. Using vender specific internal log pulling is impactful to user workloads, and there is no middle point of the amount of data received.

Therefore, there is a need in the art for improving device data collection through telemetry a streaming data telemetry interface such as datatap.

SUMMARY OF THE DISCLOSURE

A streaming data interface or a 'telemetry tap' in conjunction with a host defined telemetry program is used to regulate the type and amount of telemetry data sent to the host device. The amount of telemetry data provided to the host is based on a request. The controller will receive and execute valid host generated programs which define which telemetry operations should occur and be forwarded to the host via the streaming telemetry mechanism. The controller will use the user/host programmable mechanisms that will collaborate with internal drive logging mechanisms. The controller will watch for the host-defined programmable mechanisms and send the requested amount of telemetry data to the host once the programmable mechanisms have executed.

In one embodiment, a data storage device comprises: a memory device; and a controller coupled to the memory device, wherein the controller is configured to: collect telemetry data for the data storage device; determine an amount of telemetry data to provide to a host device, wherein the amount of data is generally less than all telemetry data collected and where the amount of data is predetermined telemetry data; and provide the predetermined telemetry data to the host device.

In another embodiment, a data storage device comprises: a memory device; and a controller coupled to the memory device, wherein the controller is configured to: receive an indication from a host device to provide telemetry data to the host device either in band or out of band; collect the telemetry data for the data storage device; and stream at least some of the collected telemetry data to the host device.

In another embodiment, a data storage device comprises: means to store data; and a controller coupled to the means to store data, wherein the controller is configured to: collect telemetry data of the data storage device; and send less than all of the telemetry data to a host device, wherein the sending is based upon a host device command to send less than all of the telemetry data, wherein sending less data is a function of a logic execution by the controller, and wherein the logic execution is predetermined based upon telemetry instructions provided by the host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments.

Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

A streaming data interface or a 'telemetry tap' in conjunction with a host defined telemetry program is used to regulate the type and amount of telemetry data sent to the host device. The amount of telemetry data provided to the host is based on a request. The controller will receive and execute valid host generated programs which define which telemetry operations should occur and be forwarded to the host via the streaming telemetry mechanism. The controller will use the user/host programmable mechanisms that will collaborate with internal drive logging mechanisms. The controller will watch for the host-defined programmable mechanisms and send the requested amount of telemetry data to the host once the programmable mechanisms have executed.

Providing a means for programmable data telemetry creates a mechanism, which can address the lack or overflow of collected drive log data, tailoring data collection to just the meaningful information to manage storage device fleets.

Figure 1:
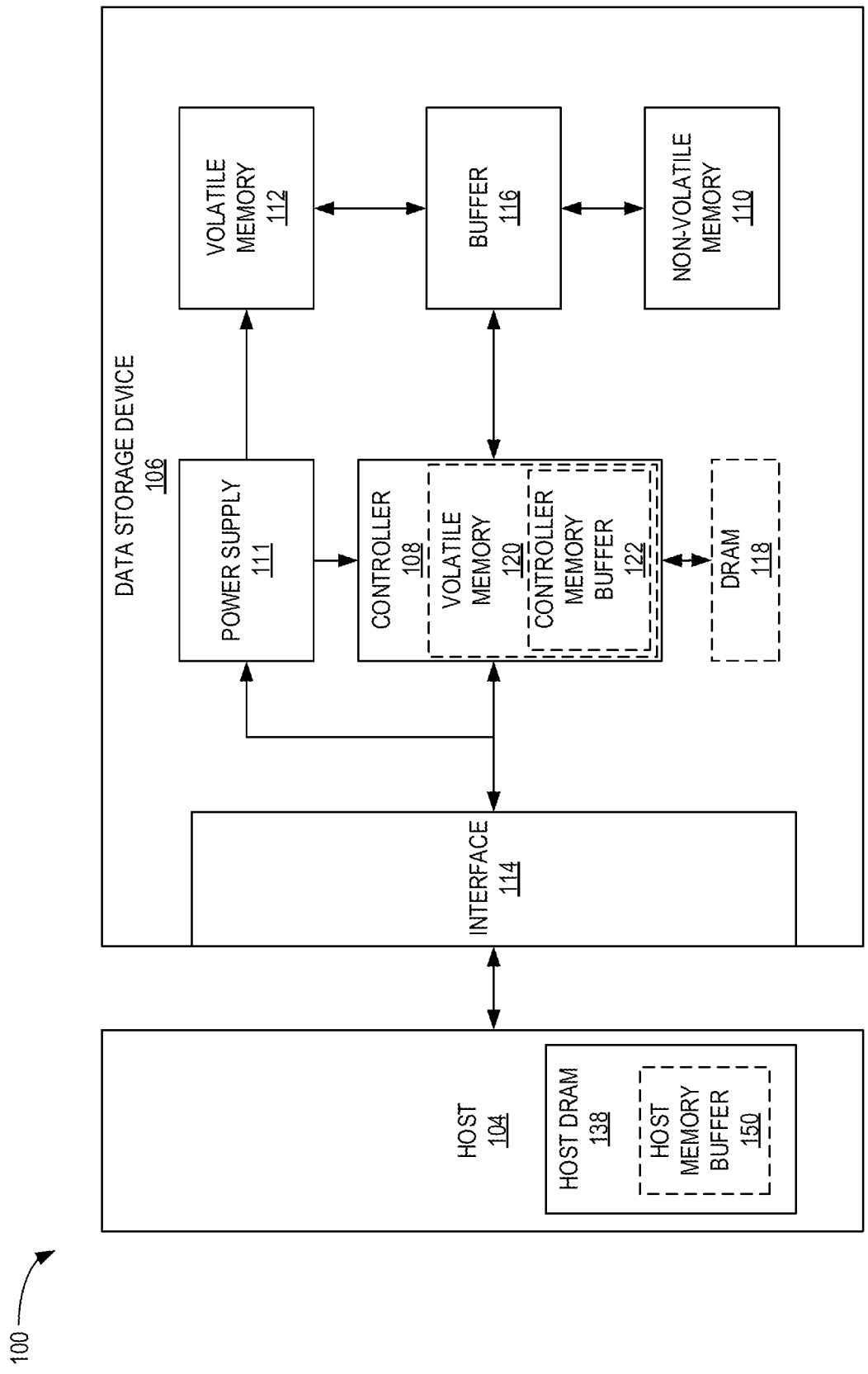
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
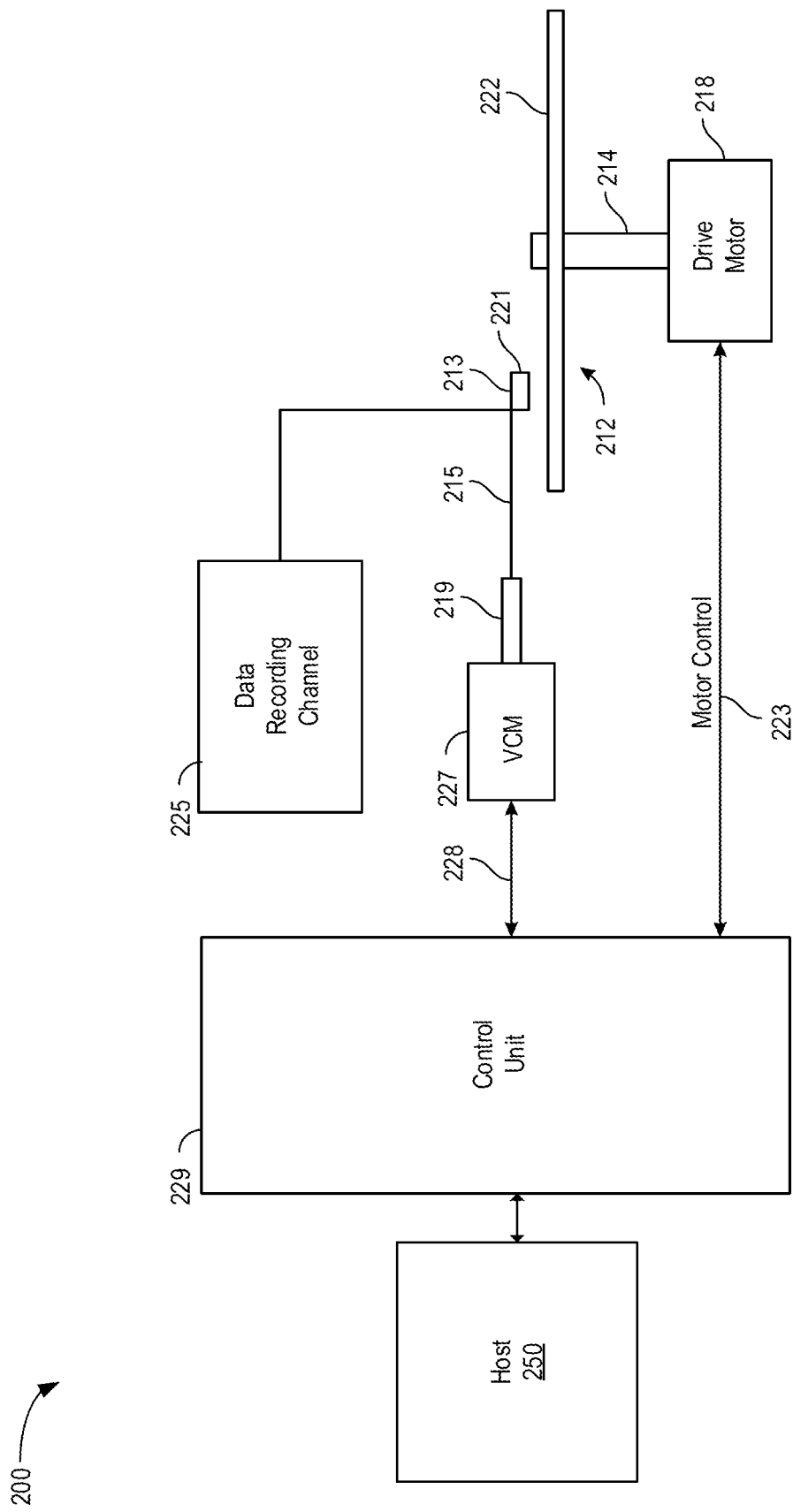
FIG. 2 is a schematic illustration of a magnetic recording device, according to one embodiment.

FIG. 2 is a schematic illustration of a magnetic recording device 200, according to one embodiment. The magnetic recording device 200 includes a magnetic recording head, such as a write head. The magnetic recording device 200 is a magnetic media drive, such as a hard disk drive (HDD) that communicates with a host device 250. Such magnetic media drives may be a single drive/device or include multiple drives/devices. For the ease of illustration, a single disk drive is shown as the magnetic recording device 200 in the implementation illustrated in FIG. 2. The magnet recording device 200 (e.g., a disk drive) includes at least one rotatable magnetic disk 212 supported on a spindle 214 and rotated by a drive motor 218. The magnetic recording on each rotatable magnetic disk 212 is in the form of any suitable patterns of data tracks, such as annular patterns of concentric data tracks on the rotatable magnetic disk 212.

At least one slider 213 is positioned near the rotatable magnetic disk 212. Each slider 213 supports a head assembly 221. The head assembly 221 includes one or more magnetic recording heads (such as read/write heads), such as a write head including a spintronic device. As the rotatable magnetic disk 212 rotates, the slider 213 moves radially in and out over the disk surface 222 so that the head assembly 221 may access different tracks of the rotatable magnetic disk 212 where desired data are written. Each slider 213 is attached to an actuator arm 219 by way of a suspension 215. The suspension 215 provides a slight spring force which biases the slider 213 toward the disk surface 222. Each actuator arm 219 is attached to an actuator 227. The actuator 227 as shown in FIG. 2 may be a voice coil motor (VCM). The VCM includes a coil movable within a fixed magnetic field, the direction and speed of the coil movements being controlled by the motor current signals supplied by a control unit 229.

The head assembly 221, such as a write head of the head assembly 221, includes a media facing surface (MFS) such as an air bearing surface (ABS) that faces the disk surface 222. During operation of the magnetic recording device 200, the rotation of the rotatable magnetic disk 212 generates an air or gas bearing between the slider 213 and the disk surface 222 which exerts an upward force or lift on the slider 213. The air or gas bearing thus counter-balances the slight spring force of suspension 215 and supports the slider 213 off and slightly above the disk surface 222 by a small, substantially constant spacing during operation.

The various components of the magnetic recording device 200 are controlled in operation by control signals generated by control unit 229, such as access control signals and internal clock signals. The control unit 229 includes logic control circuits, storage means and a microprocessor. The control unit 229 generates control signals to control various system operations such as drive motor control signals on a line 223 and head position and seek control signals on a line 228. The control signals on line 228 provide the desired current profiles to optimally move and position slider 213 to the desired data track on rotatable magnetic disk 212. Write and read signals are communicated to and from the head assembly 221 by way of recording channel 225. In one embodiment, which can be combined with other embodiments, the magnetic recording device 200 may further include a plurality of media, or disks, a plurality of actuators, and/or a plurality number of sliders.

Figure 3:
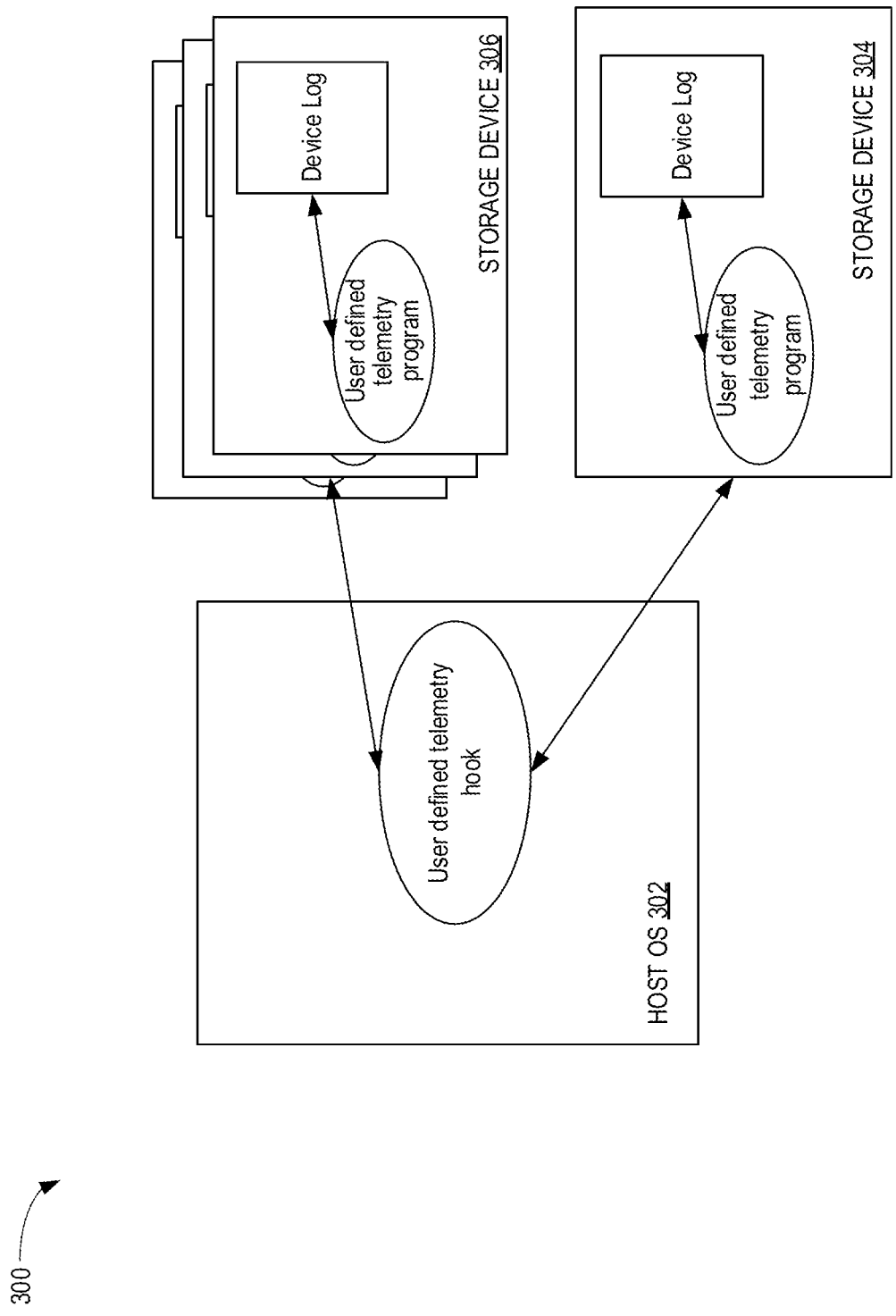
FIG. 3 is a block diagram illustrating a system with telemetry, according to one embodiment.

FIG. 3 is a block diagram illustrating a system 300 with telemetry, according to one embodiment. The system 300 comprises a host operating system (OS) 302, a first storage device 304, and a plurality of other storage devices 306. The host OS 302 comprises user defined telemetry hook. The user defined telemetry hook is in communication with both the plurality of storage devices 306 and the first storage device 304. Both the first storage device 304 and the plurality of storage devices 306 each comprise a user defined telemetry program and a device log.

Figure 4:
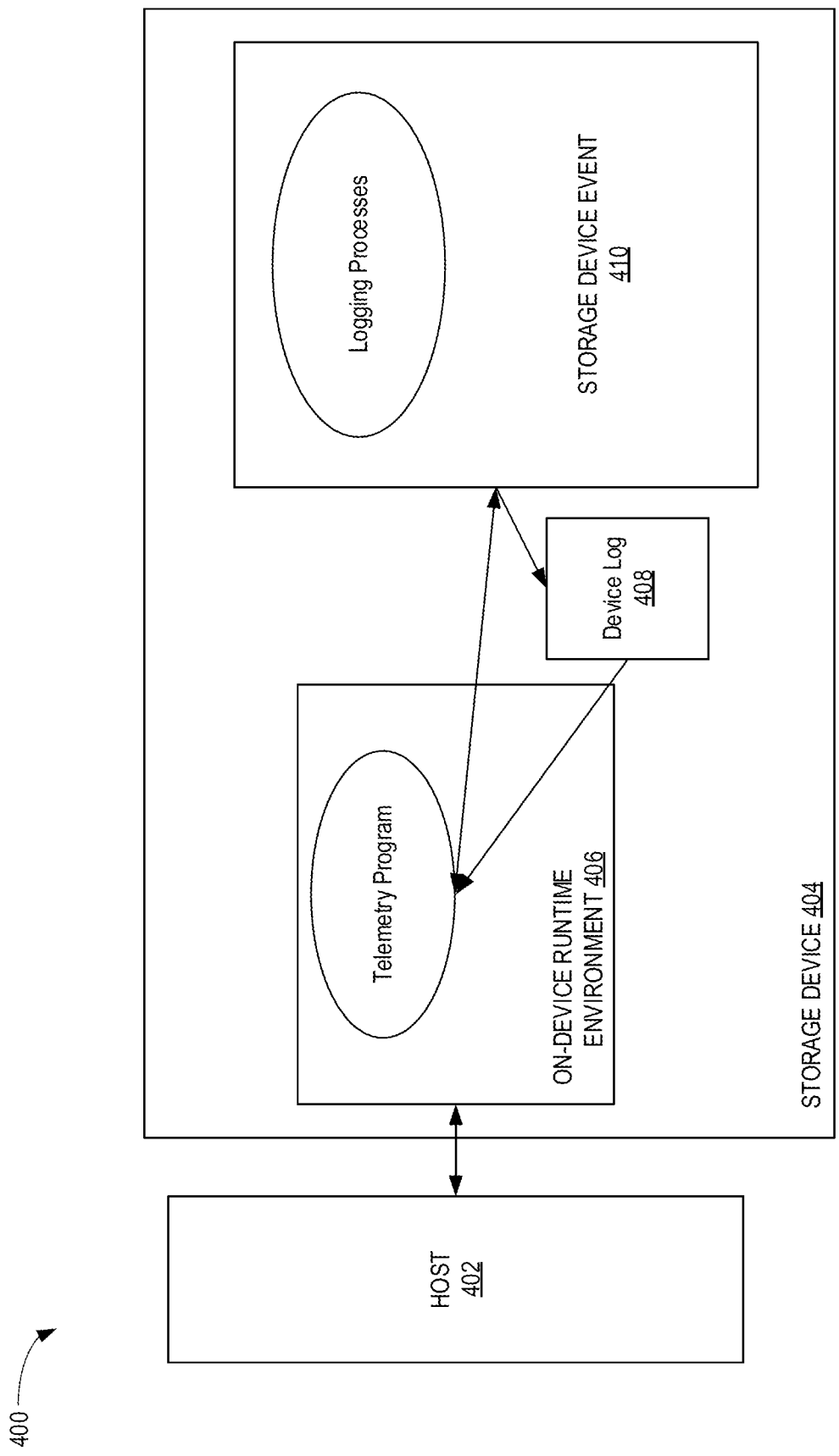
FIG. 4 is a block diagram illustrating a storage system with telemetry tap functionality, according to one embodiment.

FIG. 4 is a block diagram illustrating a storage system 400 with telemetry tap functionality, according to one embodiment. The storage system 400 comprises a host 402 and a storage device 404. The storage device 404 comprises an on-device runtime environment 406, a device log 408, and a storage device event 410. The on-device runtime environment 406 comprises a telemetry program. The storage device event 410 comprises logging processes. The telemetry program will communicate with the logging processes to regulate any requests received from the host to determine how to regulate telemetry tap functionalities.

Figure 5:
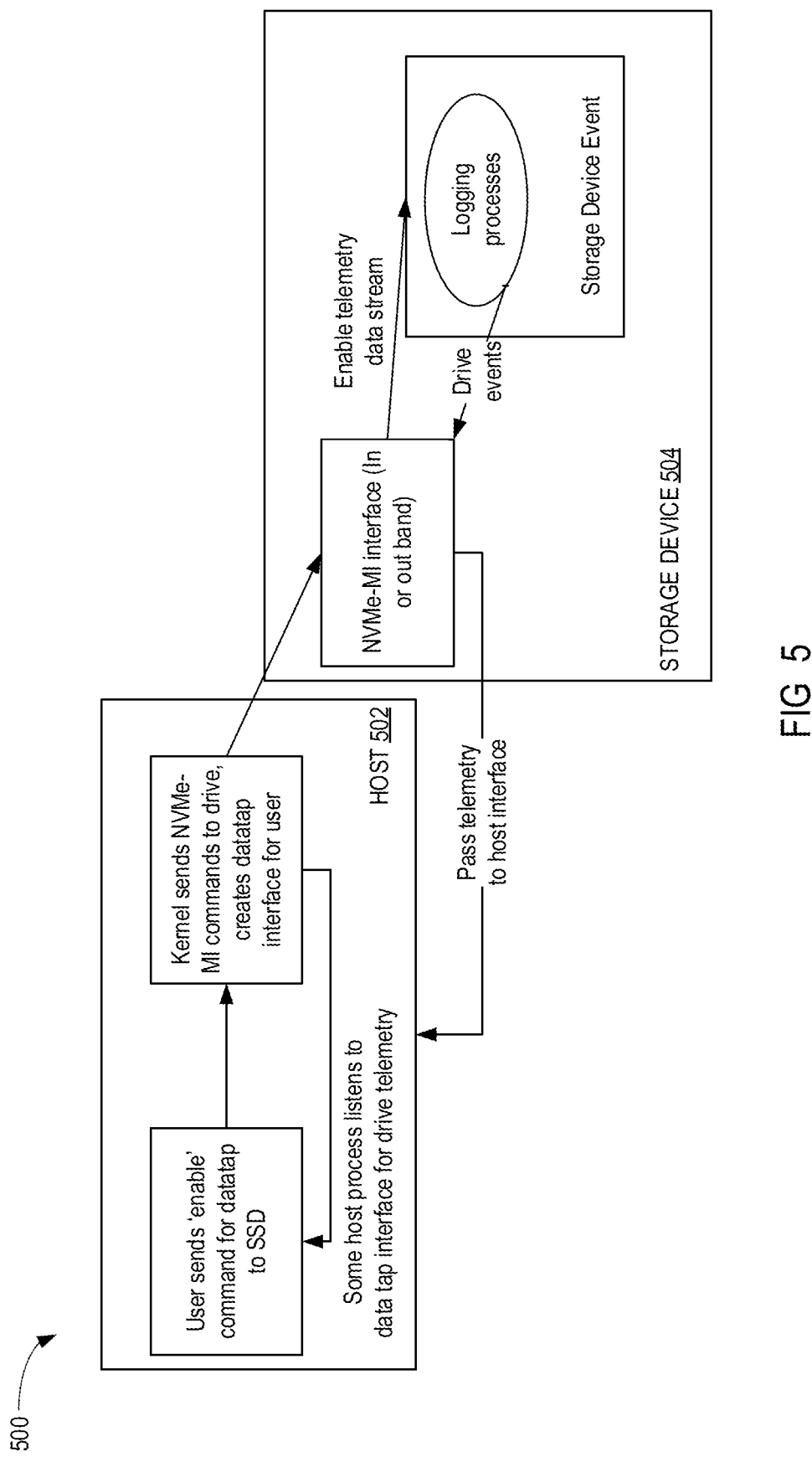
FIG. 5 is a block diagram illustrating a storage system for listening to a telemetry datatap on a SSD, according to certain embodiments.

FIG. 5 is a block diagram illustrating a storage system 500 for listening to a telemetry datatap in a SSD, according to certain embodiments. When listening to a telemetry tap a user sends a host defined executable command to a drive to enable streaming telemetry data from the drive over either an in-band or out-of-band mechanism. The linux kernel driver creates a character device for the inbound telemetry data to stream to. A host application then opens and streams data from the interface for analysis. Streaming all available telemetry data from a device as the telemetry is generated is a powerful, and low disruptive mechanism for debugging the behavior of a drive or drives in a storage system.

The storage system 500 comprises a host 502 and a storage device 504. The host 502 is configured to have the user compile telemetry executable for SSD/storage device 504. The kernel forwards user telemetry program to storage device 504 via NVMe, and enables any streaming interface endpoints needed by the host 502. Some host process listens to data tap interface for drive telemetry.

The storage device 504 comprises the created NVMe interface (in or out band). The NVMe interface is configured to enable telemetry data stream to the storage device event, such as the storage device event 410 of FIG. 4. The storage device event comprises logging processes configured to drive events to the NVMe interface. The NVMe interface is further configured to pass telemetry to the host 502.

Figure 6:
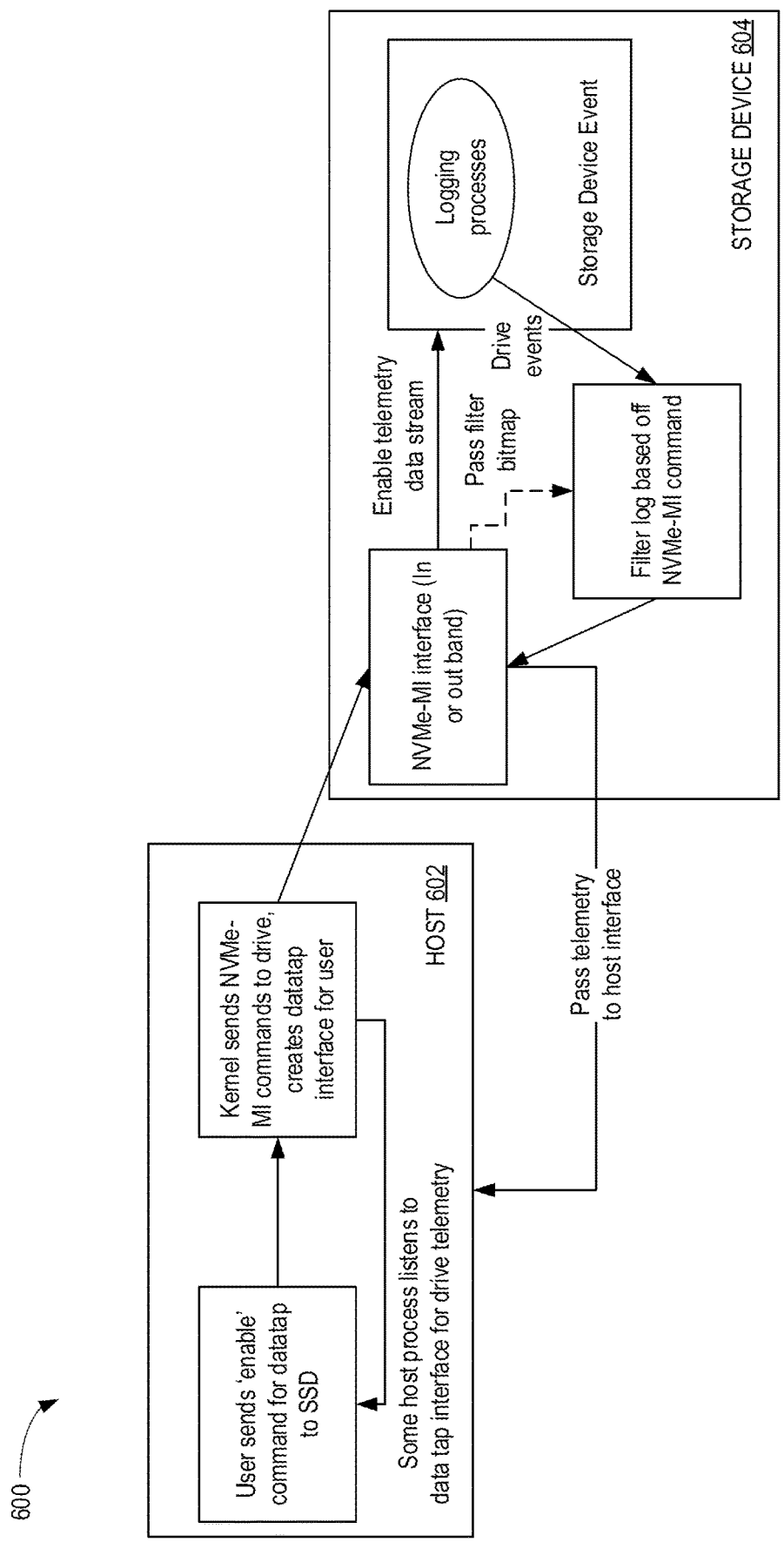
FIG. 6 is a block diagram illustrating a storage system for refined telemetry datatap on a SSD, according to certain embodiments.

FIG. 6 is a block diagram illustrating a storage system 600 for refined telemetry datatap in a SSD, according to certain embodiments. For a refined telemetry tap a user sends an NVMe payload consisting of a host defined telemetry program with host defined instructions to a drive to enable certain streaming telemetry data from the drive over either an in-band or out-of-band mechanism. The linux kernel driver creates a device for the inbound telemetry data to stream to. A host application then opens and streams data from the interface for analysis. Filtering streaming telemetry data allows for a curated telemetry for continuous monitoring of fleet health at scale. Filtering also allows users to learn which telemetry metrics are important for capture in their specific environments.

The storage system 600 comprises a host 602 and a storage device 604. The host 602 is configured to have the user compile telemetry executable for SSD/storage device 604. The kernel forwards user telemetry program to storage device 604 via NVMe, and enables any streaming interface endpoints needed by the host 602. Some host process listens to data tap interface for drive telemetry.

The storage device 604 comprises the created NVMe interface (in or out band). The NVMe interface is configured to enable telemetry data stream to the storage device event, such as the storage device event 410 of FIG. 4. The NVMe interface is configured to pass filtering program or pass instructions for filtering. The storage device event comprises logging processes configured to drive events to filter log based off host telemetry program instructions. The filtered log (telemetry) is then sent to the NVMe interface, which is further configured to pass telemetry to the host 602.

Figure 7:
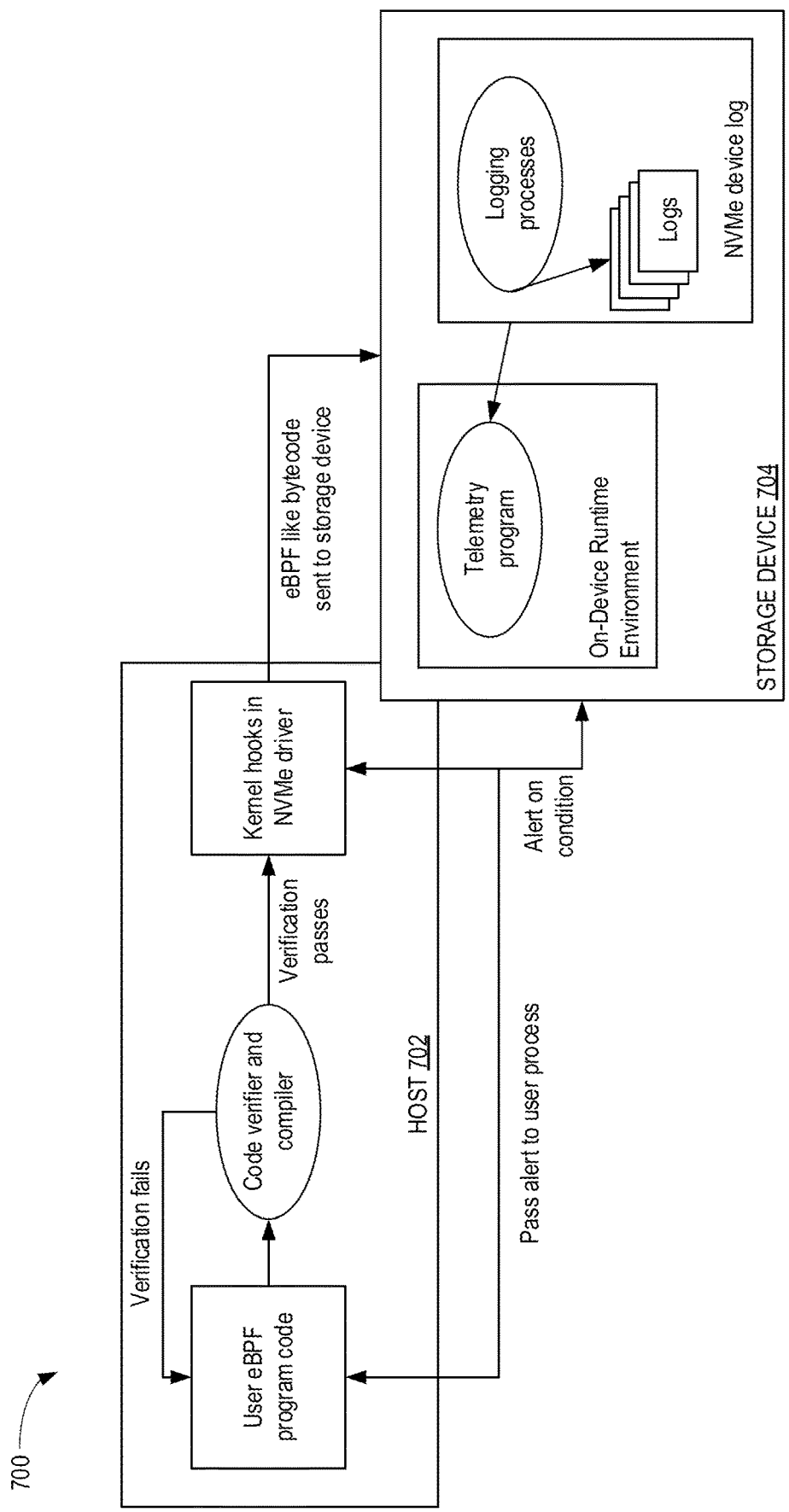
FIG. 7 is a block diagram illustrating a storage system for shipping a telemetry datatap on a SSD, according to certain embodiments.

FIG. 7 is a block diagram illustrating a storage system 700 for shipping a telemetry program to a SSD, according to certain embodiments. When shipping a telemetry program in the storage system 700 a user constructs an eBPF-like program, in user space of the host 702, sends it to the storage device, enables the host telemetry data tap, and runs the program. For example, a program can track the value of a drive log counter x, and alert the host if the value becomes greater than y. The eBPF-like program code passes through a code verifier and compiler. If the verification fails in the compiler, then the code needs to be reconstructed. Once the verification passes, the linux kernel hooks in the NVMe driver. The linux kernel then takes the compiled telemetry program and shuttles the program to the storage device 704 via mechanisms. The mechanisms can be, but are not limited to, a streaming device-to-host data interface that the host can listen to and capture device-side telemetry as the program is generated, a mechanism to run device-side user defined programs, which allows pre-computation of device-side telemetries (e.g., aggregation of events) and streaming computed result through the stream device-to-host data interface, and a mechanism to refine what device-side telemetry events are forwarded to the device-side user-defined programs and what is forwarded to the streaming device-to-host data interface.

The telemetry program deploys into a small compute/memory area in the storage device 704 capable of interpreting the eBPF-like VM byte code. The program alerts the NVMe device log comprising of logging process and logs. The alert is of what counter class of what the telemetry program is interested in. The log is then sent to the on-device runtime environment. Internal logging mechanisms of the storage device collects the telemetry of interest to the eBPF VM-like application to increment an internal count of when the user defined event occurs.

Figure 8:
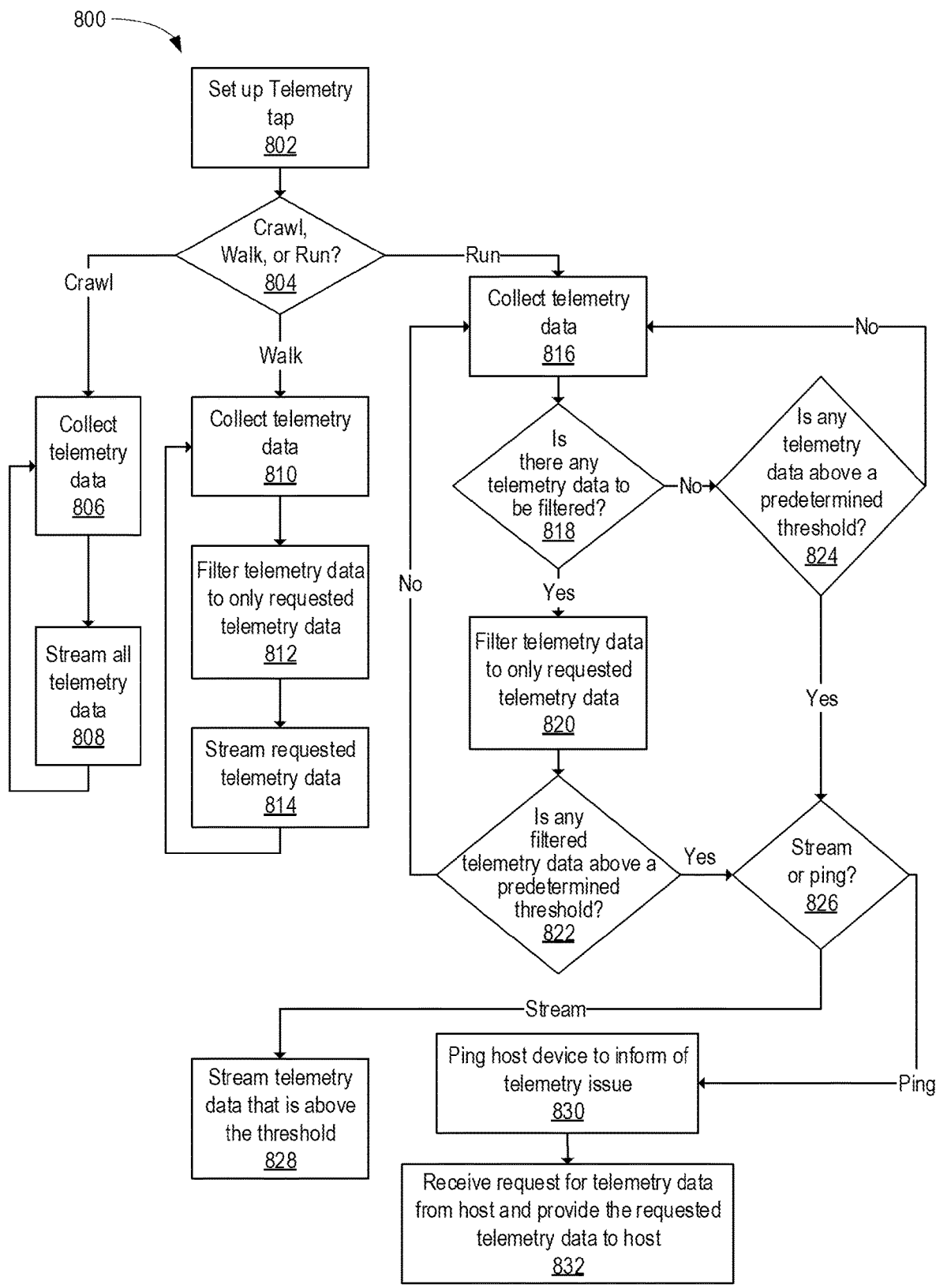
FIG. 8 is a flowchart illustrating a method for utilizing telemetry datatap, according to certain embodiments.

FIG. 8 is a flowchart illustrating a method 800 for utilizing telemetry datatap, according to certain embodiments. The method 800 begins at block 802. At block 802, the telemetry tap is set up. At block 804, the controller determines whether the datatap is a crawl, walk, or run. If the controller determines the datatap is a crawl, then the method 800 proceeds to block 806. At block 806, the controller collects telemetry data. At block 808, the controller streams all telemetry data. At the completion of block 808 the method 800 will return to block 806 to continue collecting telemetry data.

If the controller determines that the datatap is a walk, then the method 800 proceeds to block 810. At block 810, the controller collects telemetry data. At block 812, the controller filters telemetry data to only requested telemetry data. At block 814, the controller streams requested telemetry data. The method then continues by continuing to collect telemetry data at block 810.

If the controller determines that the datatap is a run, then the method 800 proceeds to block 816. At block 816, the controller collects telemetry data. At block 818, the controller determines whether there is any telemetry data to be filtered. If the controller determines that there is telemetry data to be filtered then the method 800 proceeds to block 820. At block 820, the controller filters telemetry data to only requested telemetry data. At block 822, the controller determines whether the filtered telemetry data is above a predetermined threshold. If the controller determines that the filtered telemetry data is not above the predetermined threshold, then the method 800 returns to block 816. If the controller determines that the filtered telemetry data is above the predetermined threshold, then the method 800 proceeds to block 826.

If the controller determines that there is no telemetry data to filter then the method 800 proceeds to block 824. At block 824, the controller determines whether this is any telemetry data above a predetermined threshold. If the controller determines that the telemetry data is not above the predetermined threshold, then the method 800 returns to block 816. If the controller determines that the filtered telemetry data is above the predetermined threshold, then the method 800 proceeds to block 826.

At block 826, the controller determines whether to stream or ping. If the controller determines to stream then the method 800 proceeds to block 828. At block 828, the controller streams the telemetry data that is above the predetermined threshold. If the controller determines to ping then the method 800 proceeds to block 830. At block 830, the controller pings the host device to inform of telemetry issue. At block 832, the controller receives a request for telemetry data from the host and provides the requested telemetry data to host.

Much of the telemetry that a storage device collects is not currently exposed to a host unless a large, proprietary binary log is pulled and extracted. The effort to do this is non-trivial and impacts quality of service (QOS) for user internal operations (IO) workloads. Once extracted, the logs must then be parsed and cleaned for what may be a small amount of useful data. Lowering the difficulty and amount of collected drive telemetry data for storage device monitoring drastically increases the likelihood of customer use of these now more readily available metrics for device monitoring.

In one embodiment, a data storage device comprises: a memory device; and a controller coupled to the memory device, wherein the controller is configured to: collect telemetry data for the data storage device; determine an amount of telemetry data to provide to a host device, wherein the amount of data is generally less than all telemetry data collected and where the amount of data is predetermined telemetry data; and provide the predetermined telemetry data to the host device. The memory device is a hard disk drive. The memory device is a solid state drive (SSD). The determining comprises receiving an indication from the host device of specific telemetry data that the host device shall receive. The determining comprises receiving an indication from the host device of threshold values for telemetry data to exceed prior to providing the predetermined telemetry data to the host device. The threshold values are for generally less than all telemetry data. The controller is configured to determine whether any threshold value of the threshold values has been exceeded. Providing the predetermined telemetry data to the host device comprises streaming the predetermined telemetry data. The controller is configured to receive a command from the host device to enable the streaming as either in band or out of band. Providing the predetermined telemetry data to the host device comprises: pinging the host device; receiving a request from the host device for the predetermined telemetry data; and sending the predetermined telemetry data in response to receiving the request.

In another embodiment, a data storage device comprises: a memory device; and a controller coupled to the memory device, wherein the controller is configured to: receive an indication from a host device to provide telemetry data to the host device either in band or out of band; collect the telemetry data for the data storage device; and stream at least some of the collected telemetry data to the host device. The controller is configured to stream the at least some telemetry data to a host device interface. The at least some telemetry data is less than all telemetry data. The controller is configured to receive an instruction from the host device identifying the less than all telemetry data to be streamed. The controller is configured to receive an instruction from the host device. The telemetry data comprises monitoring information of health of the data storage device. The controller is configured to maintain a filter log of the telemetry data.

In another embodiment, a data storage device comprises: means to store data; and a controller coupled to the means to store data, wherein the controller is configured to: collect telemetry data of the data storage device; and send less than all of the telemetry data to a host device, wherein the sending is based upon a host device command to send less than all of the telemetry data. The sending occurs after pinging the host device and receiving a command to send the less than all of the telemetry data. The less than all of the telemetry data is based upon exceeding a predetermined threshold.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device;
an interface, wherein the interface is configured to:
    receive a telemetry program from a host device, wherein the telemetry program is configured to interpret Extended Berkeley Packet Filter (e-BPF) virtual machine (VM) byte code; and
    pass telemetry data to the host device, wherein the passing is enabled by executing the telemetry program; and
a controller coupled to the memory device and the interface, wherein the controller is configured to:
    receive a request from the host device over the interface to send telemetry data of the data storage device, wherein the request specifies a type and an amount of telemetry data to send;
    filter telemetry data based on the type specified in the request, wherein the filtered telemetry data is generally less than all telemetry data collected;
    determine whether an amount of the filtered telemetry data is greater than the amount requested by the host device;
    continue the filtering until the amount of the filtered telemetry data is greater than the amount requested by the host device;
    based on a determination that the amount of the filtered telemetry data is greater than the amount requested by the host device, send the filtered telemetry data via streaming to the host device over the interface or pinging the host device; and
    stream the type and the amount specified in the request of the filtered telemetry data to the host device over the interface.

2. The data storage device of claim 1, wherein the memory device is a hard disk drive.

3. The data storage device of claim 1, wherein the memory device is a solid state drive (SSD).

4. The data storage device of claim 1, wherein the filtering comprises receiving an indication from the host device of specific telemetry data that the host device shall receive.

5. The data storage device of claim 1, wherein the amount specified in the request for the filtered telemetry data is indicated to controller prior to the sending.

6. The data storage device of claim 5, wherein the amount specified in the request is for generally less than all telemetry data.

7. The data storage device of claim 1, wherein the controller is configured to receive a command from the host device to enable the streaming as either in band or out of band.

8. The data storage device of claim 1, wherein sending the filtered telemetry data via pinging the host device comprises:
pinging the host device;
receiving a second request from the host device for the filtered telemetry data; and
sending the type and the amount specified in the request of the filtered telemetry data in response to receiving the second request.

9. The data storage device of claim 1, wherein the controller is configured to
store the telemetry program on an on-device runtime environment of the data storage device.

10. The data storage device of claim 9, wherein the controller is further configured to:
alert, via the telemetry program, the memory device of a counter class that the telemetry program is interested in; and
increase an internal counter associated with the counter class.

11. A data storage device, comprising:
a memory device;
an interface, wherein the interface is configured to:
    receive a telemetry program from a host device, wherein the telemetry program is configured to interpret Extended Berkeley Packet Filter (e-BPF) virtual machine (VM) byte code; and
    pass telemetry data to the host device, wherein the passing is enabled by executing the telemetry program; and
a controller coupled to the memory device and the interface, wherein the controller is configured to:
    receive a request from the host device over the interface to send telemetry data to the host device either in band or out of band, wherein the request specifies a type and an amount of telemetry data to send;
    filter telemetry data based on the type specified in the request;
    determine whether an amount of the filtered telemetry data is greater than the amount requested by the host device;
    continue the filtering until the amount of the filtered telemetry data is greater than the amount requested by the host device;
    based on a determination that the amount of the filtered telemetry data is greater than the amount requested by the host device, send the filtered telemetry data via streaming to the host device over the interface; and
    stream the type and the amount specified in the request of the filtered telemetry data to the host device using the interface.

12. The data storage device of claim 11, wherein the controller is configured to stream the filtered telemetry data to a host device interface.

13. The data storage device of claim 12, wherein the filtered telemetry data is less than all telemetry data.

14. The data storage device of claim 13, wherein the controller is configured to receive an instruction from the host device identifying the less than all telemetry data to be streamed.

15. The data storage device of claim 11, wherein the request from the host device is received prior to the sending.

16. The data storage device of claim 11, wherein the controller is configured to monitor information of health of the data storage device.

17. The data storage device of claim 11, wherein the controller is configured to maintain a filter log of the telemetry data.

18. A data storage device, comprising:
means to store data;
an interface, wherein the interface is configured to:
    receive a telemetry program from a host device, wherein the telemetry program is configured to interpret Extended Berkeley Packet Filter (e-BPF) virtual machine (VM) byte code; and
    pass telemetry data to the host device, wherein the passing is enabled by executing the telemetry program; and
a controller coupled to the means to store data and the interface, wherein the controller is configured to:

receive a request from the host device over the interface to send telemetry data of the data storage device, wherein the request specifies a type and an amount of telemetry data to send;

filter telemetry data based on the type specified in the request;

determine whether an amount of the filtered telemetry data is greater than the amount requested by the host device;

based on a determination that the amount of the filtered telemetry data is greater than the amount requested by the host device, send the filtered telemetry data via streaming to the host device over the interface; and stream the type and the amount specified in the request of the filtered telemetry data to the host device over the interface via an in-band or out-of-band mechanism.

19. The data storage device of claim 18, wherein the sending occurs after pinging the host device and receiving a command to send less than all of the telemetry data.

* * * * *